United States Patent [19]
Girard et al.

[11] Patent Number: 5,566,580
[45] Date of Patent: Oct. 22, 1996

[54] MOTION TRANSMITTING ROD WITH SECURITY DEVICE

[75] Inventors: André Girard, La Chapelle Du Noyer; Giovanni Piu, Bourges, both of France

[73] Assignee: Hutchinson, Paris, France

[21] Appl. No.: 374,510

[22] PCT Filed: May 17, 1994

[86] PCT No.: PCT/FR94/00585

§ 371 Date: Mar. 3, 1995

§ 102(e) Date: Mar. 3, 1995

[87] PCT Pub. No.: WO94/27068

PCT Pub. Date: Nov. 24, 1994

[30] Foreign Application Priority Data

May 18, 1993 [FR] France .................. 93 05991
Jul. 20, 1993 [FR] France .................. 93 08887

[51] Int. Cl.$^6$ .......... G05G 25/00; B60K 20/00; F16H 59/02
[52] U.S. Cl. ............ 74/473 R; 74/579 R; 403/300; 403/305; 403/306
[58] Field of Search ................ 74/473 R, 579 R; 403/300, 305, 306, 316, 319, 220, 224, 279

[56] References Cited

U.S. PATENT DOCUMENTS

| | | | |
|---|---|---|---|
| 4,492,129 | 1/1985 | Hasegawa | 74/473 R |
| 4,777,839 | 10/1988 | Lindholm et al. | 74/473 R |
| 4,960,009 | 10/1990 | Schultz et al. | 403/306 X |
| 5,189,925 | 3/1993 | Neal et al. | 74/473 R |
| 5,347,881 | 9/1994 | Watson et al. | 74/473 R |

*Primary Examiner*—Allan D. Herrmann
*Attorney, Agent, or Firm*—Larson and Taylor

[57] ABSTRACT

A motion transmitting rod (16), particularly for a gear box, has as a portion of its length an elastic filtering sleeve (11) engaged by its ends into two tubular extremities (17) of two rod parts of the rod (16) which rod parts are then connected to each other. The sleeve can be a rectangular cross-section bar (12) coated with an elastic coating (13). In addition, the bar (12) has at the union between the tubular extremities (17) of the rod at least one widening portion (18) which is also coated with the coating (13) and which is engaged into two notches (19) with shapes complementary of that of the widening portion (18) and provided at the end in the extremities (17).

14 Claims, 4 Drawing Sheets

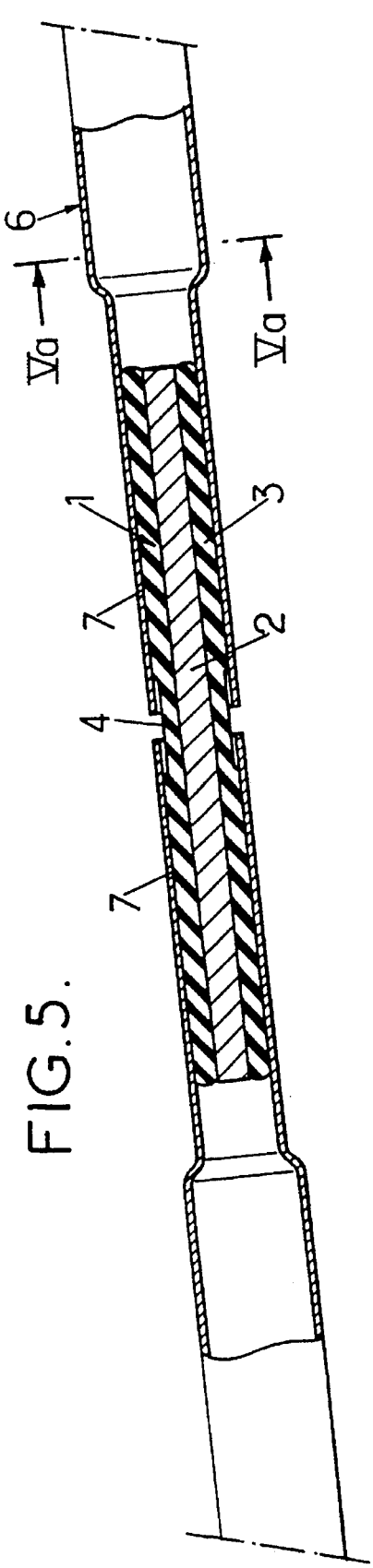
FIG. 5.
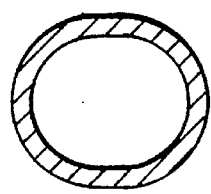
FIG. 5a
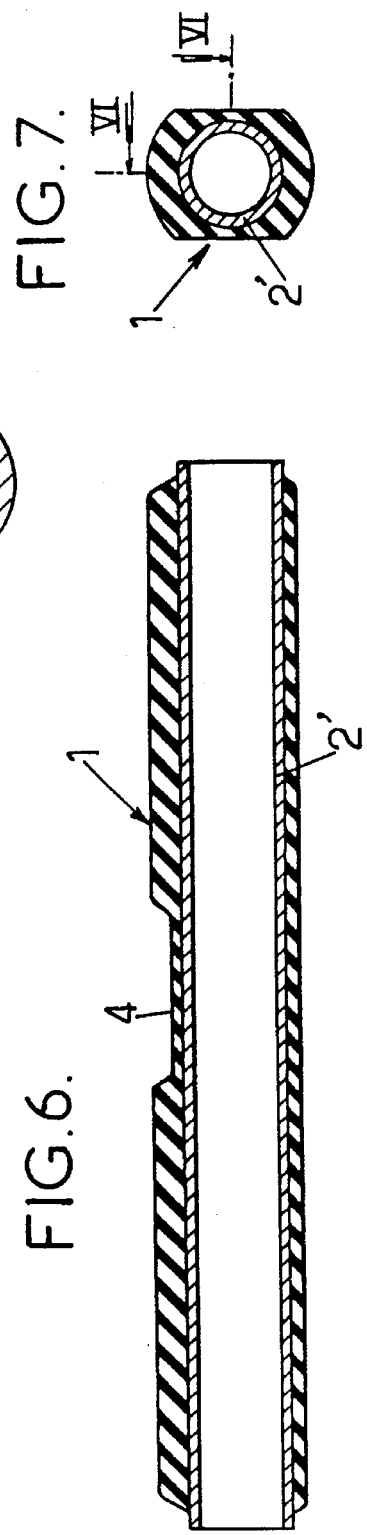
FIG. 7.
FIG. 6.

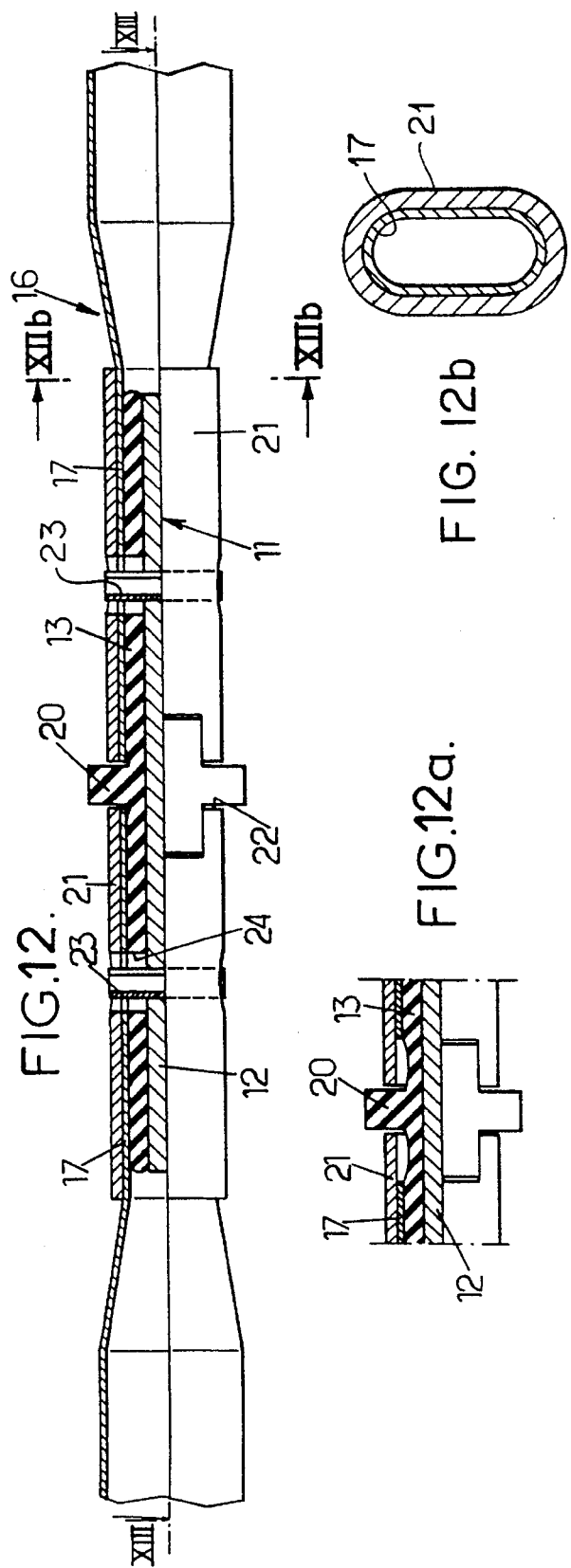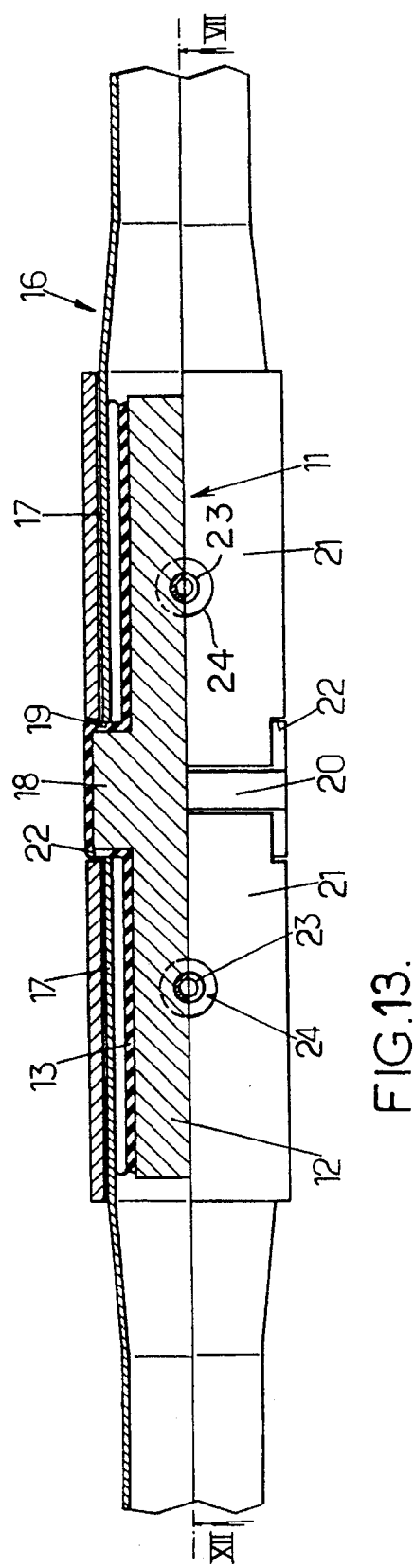

MOTION TRANSMITTING ROD WITH SECURITY DEVICE

FIELD OF THE INVENTION

The present invention relates to a motion transmission rod, especially for operating a gearbox.

BACKGROUND OF THE INVENTION

In order to prevent vibration being transmitted from the gearbox to the operating lever, use may be made of cable connections, or a filtering joint may be located at the extremity of the transmission rod, but these solutions are expensive.

SUMMARY OF THE INVENTION

The object of the present invention is to provide other solutions to this problem, which are simple to fit and relatively inexpensive to manufacture, while complying with the overall space requirement stipulations.

To this end, a rod in accordance with the invention includes, over a part of its length, an elastic filtering sleeve and is characterized in that this sleeve is engaged via its extremities in two tubular extremities of the rod, which are thus connected to each other.

This sleeve will generally include a rigid core coated with an elastic coating, this cores consisting, for example, of a rod of rectangular cross section or of a tube of round cross section.

In order to contrive for the rod to transmit the movements of the lever accurately, while effectively filtering out vibration, it may further be characterized in that said sleeve transversely has various stiffnesses.

This could be obtained by the shape of the cross section of the rigid core, and also by the fact that said tubular extremities of the rod are flattened in order to produce the clamping of said sleeve.

Other improvements to this rod consist in making sure that the two tubular extremities of the rod, connected to each ocher by the elastic filtering sleeve, cannot pivot with respect to one another about the axis of the rod while it is being operated.

To this end, a rod as defined hereinabove is, in accordance with the present invention, further characterized in that said rod has, in the region of the union between said tubular extremities of the rod, at least one widened part also coated with said elastic coating and engaged in two notches of shape complementary to that of said widened part and made in the end face of said extremities.

Preferably, two widened parts will even be provided, these also being coated with said elastic coating and engaged in two pairs of notches of shape respectively complementary to those of these widened parts, and made in the end face of said extremities.

Thus, this pivoting of the two tubular extremities of the rod will be prevented, and this will be the case without any rigid bridge being established between these extremities, because these widened parts are coated with elastic material.

According to another provision of the invention, said elastic coating of the sleeve has a peripheral bead capable of being inserted, after fitting, between said tubular extremities of the rod.

This bead will thus constitute an elastic limit stop between these extremities, capable of limiting their axial movement with respect to each other, and here again without creating any rigid union between these extremities.

Advantageously, the rod could be further characterized in that two flattened lengths of reinforcing tube are clamped onto said flattened tubular extremities of the rod, which will reinforce the rod at this point.

In order to prevent these lengths from pivoting axially with respect to each other, it is advantageous for them to include at the end, in their facing extremities, notches similar to those which are made in the end face of the tubular extremities of the rod, so as to receive the extremities of said widened parts.

BRIEF DESCRIPTION OF THE DRAWINGS

Various embodiments of the invention will now be described by way of non-limiting examples, with reference to the figures of the appended drawing in which:

FIG. 5 is a view on a larger scale of the sectioned part of FIG. 4 and FIG. 5a is a view in radial section of the tubular extremity of the operating rod on the line Va—Va of FIG. 5;

FIG. 6 is a view in axial section of an alternative filtering sleeve on the line VI—VI of FIG. 7;

FIG. 7 is an end-on view of this filtering sleeve;

FIG. 12 is a half view in section on the line XII—XII of FIG. 13, of a transmission rod in accordance with the invention, equipped with the sleeve of FIGS. 8 to 11 and with a half view in elevation, FIG. 12a being a partial view of an alternative and FIG. 12b being a view in radial section of the tubular extremity of the operating rod on the line XIIb—XIIb of FIG. 12; and FIG. 13 is a half view in section on the line XIII—XIII of FIG. 12 of the rod of FIG. 12 with a half view in plan.

DESCRIPTION OF THE PREFERRED EMBODIMENTS

Figure 2:
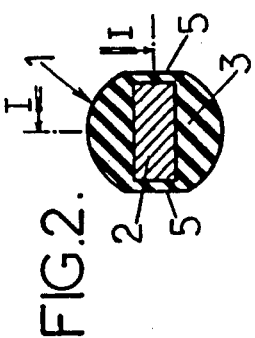
FIG. 2 is an end-on view of the filtering sleeve.
Figure 1:
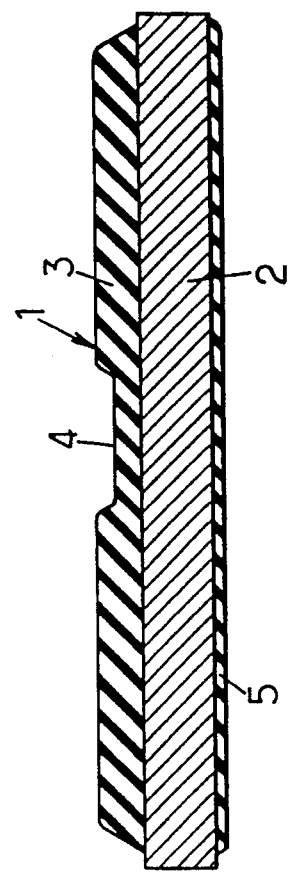
FIG. 1 is a view in axial section of the filtering sleeve before fitting into the rod, on the line I—I of FIG. 2.

The filtering sleeve 1 of FIGS. 1 and 2 includes a solid metal rigid core 2 with rectangular cross section, coated with an elastic coating 3, for example made of elastomer or rubber. This coating has a groove 4 at its middle and on either side of this groove has a cylindrical or similar overall shape, with two lateral flats 5, which after fitting will make it possible to obtain differentiated transverse stiffnesses, in two mutually orthogonal directions perpendicular to the axis of the sleeve.

Figure 3:
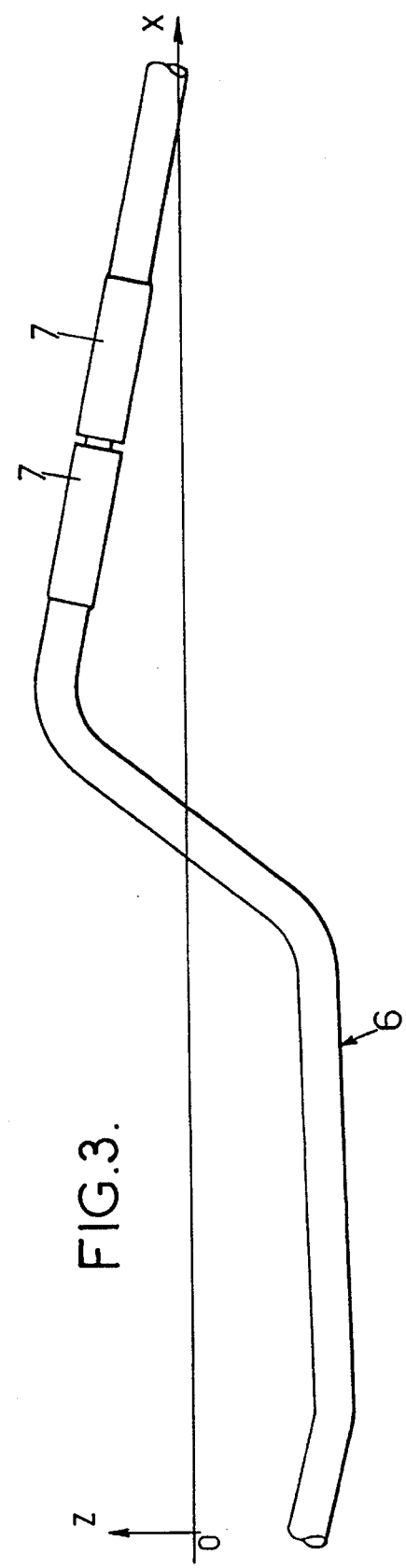
FIG. 3 is a side view of a rod for operating a gearbox equipped, in accordance with the invention, with the sleeve of FIGS. 1 and 2.
Figure 4:
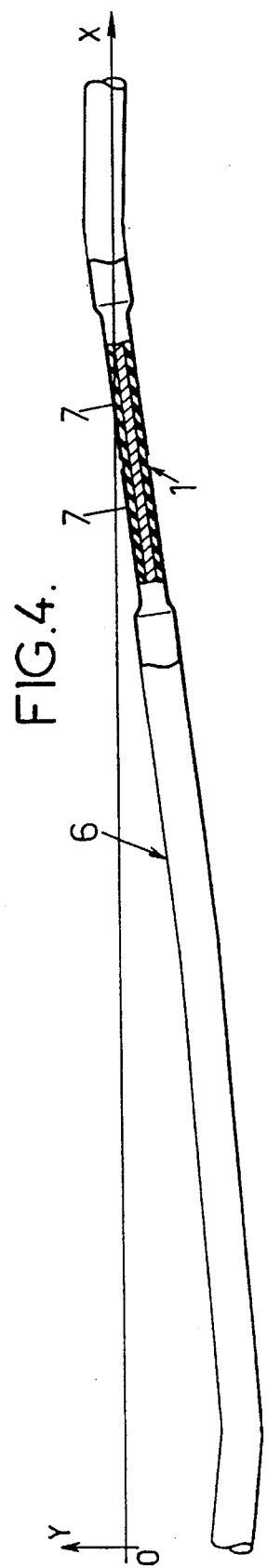
FIG. 4 is a plan view of this rod, with partial axial section in the region of the filtering sleeve.
Figure 8:
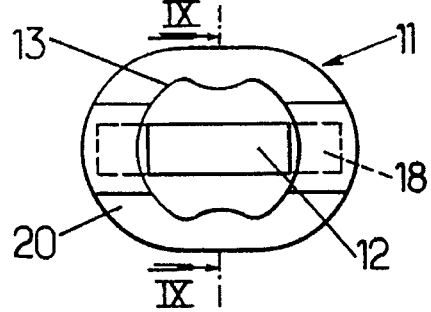
FIG. 8 is an end-on view of a sleeve of another transmission rod in accordance with the invention.
Figure 9:
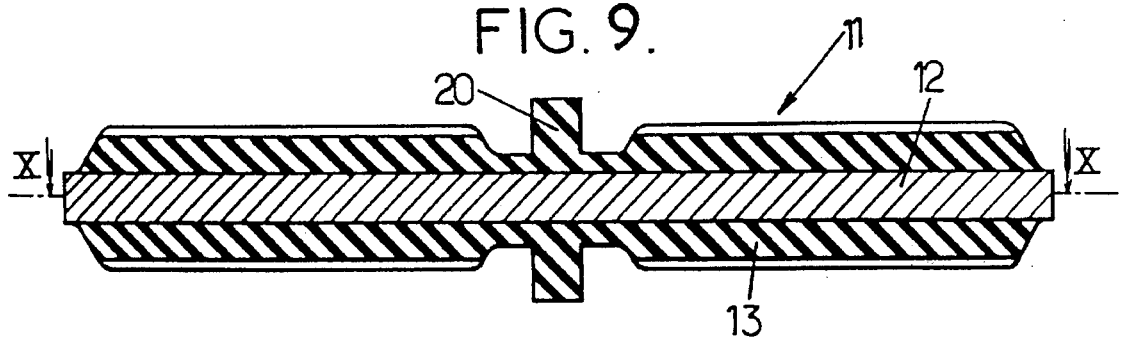
FIG. 9 is a sectional view on the line IX—IX of FIG. 8.
Figure 10:
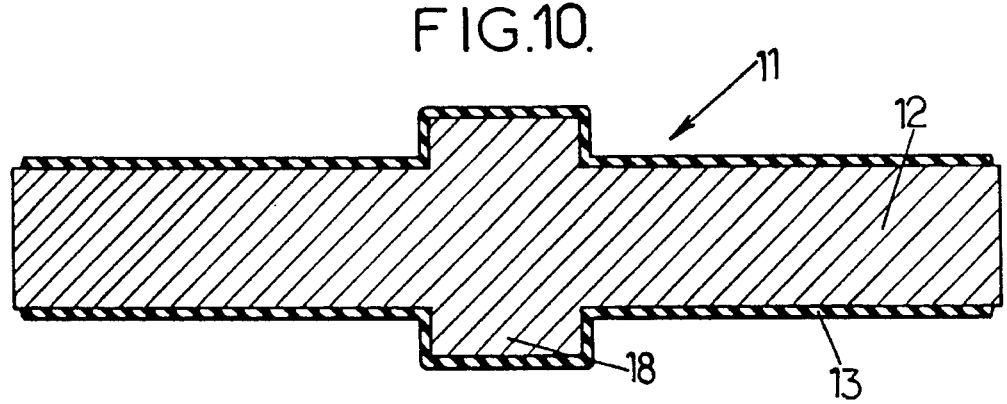
FIG. 10 is a sectional view on the line X—X of FIG. 9.
Figure 11:
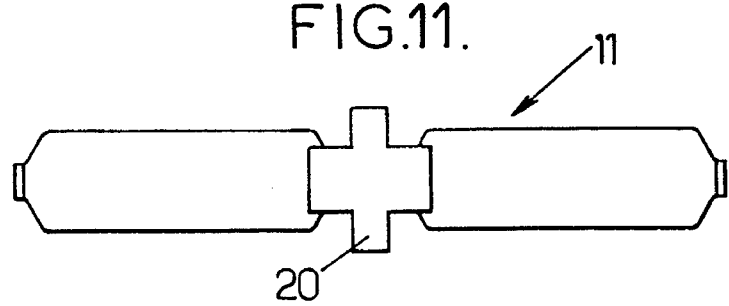
FIG. 11 is a side view of the sleeve on a smaller scale.

In FIG. 3, a tubular operating rod has been referenced overall as 6. This rod is sectioned transversely, and the sleeve 1 is engaged in the two tubular extremities 7 of the rod, which are thus connected to each other. These two extremities are then flattened (as shown by FIG. 5a), which secures them perfectly to the filtering sleeve 1. The presence of the groove 4 in the elastic coating 3 prevents the formation of a bead projecting from the surface of the rod, between the tubular extremities 7.

The filtering sleeve 1 of FIGS. 6 and 7 may have the same external shape as the previous one, but its solid core 2 is replaced by a tubular core 2'.

It will be understood that the various thicknesses of the elastic coating 3, combined with the flattening of the tubular extremities 7, make it possible to give the sleeve, after it has been fitted into the rod, the desired differentiated transverse stiffnesses; the axial stiffness and torsional stiffness can likewise be adjusted as desired, by an appropriate choice of the thicknesses of the elastomeric coating as well as its length.

The filtering sleeve 11 represented in FIGS. 8 to 12 includes a solid and rigid core 12 consisting, for example, of a flat metal strip provided with two lateral widened parts 18 and coated with a coating of rubber or elastomer 13. In its central part, the coating, which elsewhere matches the shape of the bar 12, has a peripheral bead 20.

This sleeve is inserted into the tubular extremities 17 of a previously sectioned transmission rod 16, which extremities are provided at their end face with two notches 19 opening towards one another, into which the widened parts 18 of the sleeve are engaged (see FIGS. 12 and 13). This prevents any relative axial rotation between the two tubular extremities 17, even a minimal rotation, which eliminates any risk of rotational play and therefore any risk of inaccuracy in the operation. Of course, the bead 20 is interposed between the end faces of the extremities 17, on either side of the above-mentioned notches, so that it constitutes an elastic compression limit stop between them.

This being the case, fitting can be completed by flattening the two tubular extremities 17, complementary to the elastic coating 13 and thus securing these two extremities.

However, it may be preferable to fit two reinforcing tubes 21 on these extremities 17 beforehand, these reinforcing tubes including at their end, in their facing extremities, notches 22 similar to those made in the end face of the tubular extremities 17 of the rod, so as to receive the extremities of said widened parts 18.

It is then the whole of the these lengths 21 and of the tubular extremities 17 which is flattened, as can be seen by FIG. 12b; in that way a rod 16 which is reinforced in the region of its cut is obtained, which cut has eliminated any rigid bridge between the extremities 17, without in any way introducing into the transmission play which would be prejudicial to the accuracy of operation.

In theory, the compressed sleeve 11 prevents the tubular extremities 17 from pulling apart, but safety can be enhanced in this respect by virtue of pins 23 passing both through the tubes 17 and 21 and through the bar 12. Oblong holes 24 or holes with a larger diameter than that of the pins, possibly rubberized, provided either in the bar or in the tubes (case of the drawing) will further prevent the creation of any rigid bridge between the tubular extremities 17.

Finally, it should be noted that in the event of reinforcing lengths being used, the notches may be provided just in these reinforcing tubes, being absent from the tubular extremities 17. In this case, of course, separation between the ends of these tubular extremities will be at least equal to the width of the widened parts 18 (see detail FIG. 12a).

We claim:

1. A motion transmission rod comprising:

two rod parts having adjacent tubular extremities; and an elastic filtering sleeve including
   a rigid core,
   an elastic coating on said rigid core, and
   two opposite sleeve extremities of said coated rigid core which are engaged in said tubular extremities whereby said filtering sleeve connects said rod parts to each other.

2. A motion transmission rod as claimed in claim 1 wherein said rigid core is a bar with a rectangular cross section.

3. A motion transmission rod as claimed in claim 1 wherein said rigid core is a tube with a round cross section.

4. A motion transmission rod as claimed in claim 1 wherein said filtering sleeve has various stiffnesses in a transverse direction.

5. A motion transmission rod as claimed in claim 1 wherein said tubular extremities have opposed flattened sides; and wherein said filtering sleeve has a cylindrical overall shape with lateral flats which mate with respective ones of said opposed flattened sides of said tubular extremities, and a circumferential groove in a longitudinally central part thereof.

6. A motion transmission rod comprising:

two rod parts having adjacent tubular extremities, each said extremity including an end face with a notch therein; and an elastic filtering sleeve including
   a bar of rectangular cross section having a widened part at a central longitudinal part thereof,
   an elastic coating on said bar including said widened part, and
   two opposite sleeve extremities of said coated bar which are engaged in said tubular extremities whereby said widened part of said bar is complementarily received in said notches of said tubular extremities as said filtering sleeve connects said rod parts to each other.

7. A motion transmission rod as claimed in claim 6 wherein each said tubular extremity includes a second notch in the end face thereof; and wherein said bar includes a second widened part at a central longitudinal part thereof which is coated by said elastic coating such that said second widened part is complementarily received in said second notches when said filtering sleeve connects said rod parts to each other.

8. A motion transmission rod as claimed in claim 6 wherein said elastic coating includes a peripheral bead which extends between said tubular extremities when said filtering sleeve connects said rod parts to each other.

9. A motion transmission rod as claimed in claim 6 wherein each said tubular extremity includes opposed flattened parts which extend parallel to opposed sides of said rectangular bar.

10. A motion transmission rod as claimed in claim 9 and further including a respective flattened reinforcing tube which is complementarily clamped over a respective said flattened tubular extremity.

11. A motion transmission rod as claimed in claim 10 wherein each said reinforcing tube includes a notch whereby said widened part of said bar is complementarily received in said notches of said reinforcing tubes as well as in the notches of said tubular extremities as said filtering sleeve connects said rod parts to each other.

12. A motion transmission rod as claimed in claim 6 wherein each said tubular extremity has a first transverse hole therein and wherein said bar has respective second transverse holes therein transversely aligned with a respective said first transverse hole; and further including respective pins which are received and held in respective aligned said first and second holes.

13. A motion transmission rod comprising:

two rod parts having adjacent tubular extremities;

an elastic filtering sleeve including
- a bar of rectangular cross section having a widened part at a central longitudinal part thereof,
- an elastic coating on said bar including said widened part, and
- two opposite sleeve extremities of said coated bar which are engaged in said tubular extremities; and a respective flattened reinforcing tube which is complementarily clamped over a respective said flattened tubular extremity, each said extremity including an end face with a notch therein whereby said widened part of said bar is complementarily received in said notches of said tubular extremities as said filtering sleeve connects said rod parts to each other.

14. A motion transmission rod as claimed in claim 13 wherein each said tubular extremity has a first transverse hole therein and wherein said bar has respective second transverse holes therein transversely aligned with a respective said first transverse hole; and further including respective pins which are received and held in respective aligned said first and second holes.

* * * * *